Aug. 11, 1936.   O. ZANCAN   2,050,910

CLUTCH

Filed Dec. 11, 1934   3 Sheets-Sheet 1

INVENTOR
Ottavio Zancan
BY
ATTORNEY

Aug. 11, 1936.　　　　O. ZANCAN　　　　2,050,910
CLUTCH
Filed Dec. 11, 1934　　　3 Sheets-Sheet 2

INVENTOR
Ottavio Zancan
BY
ATTORNEY

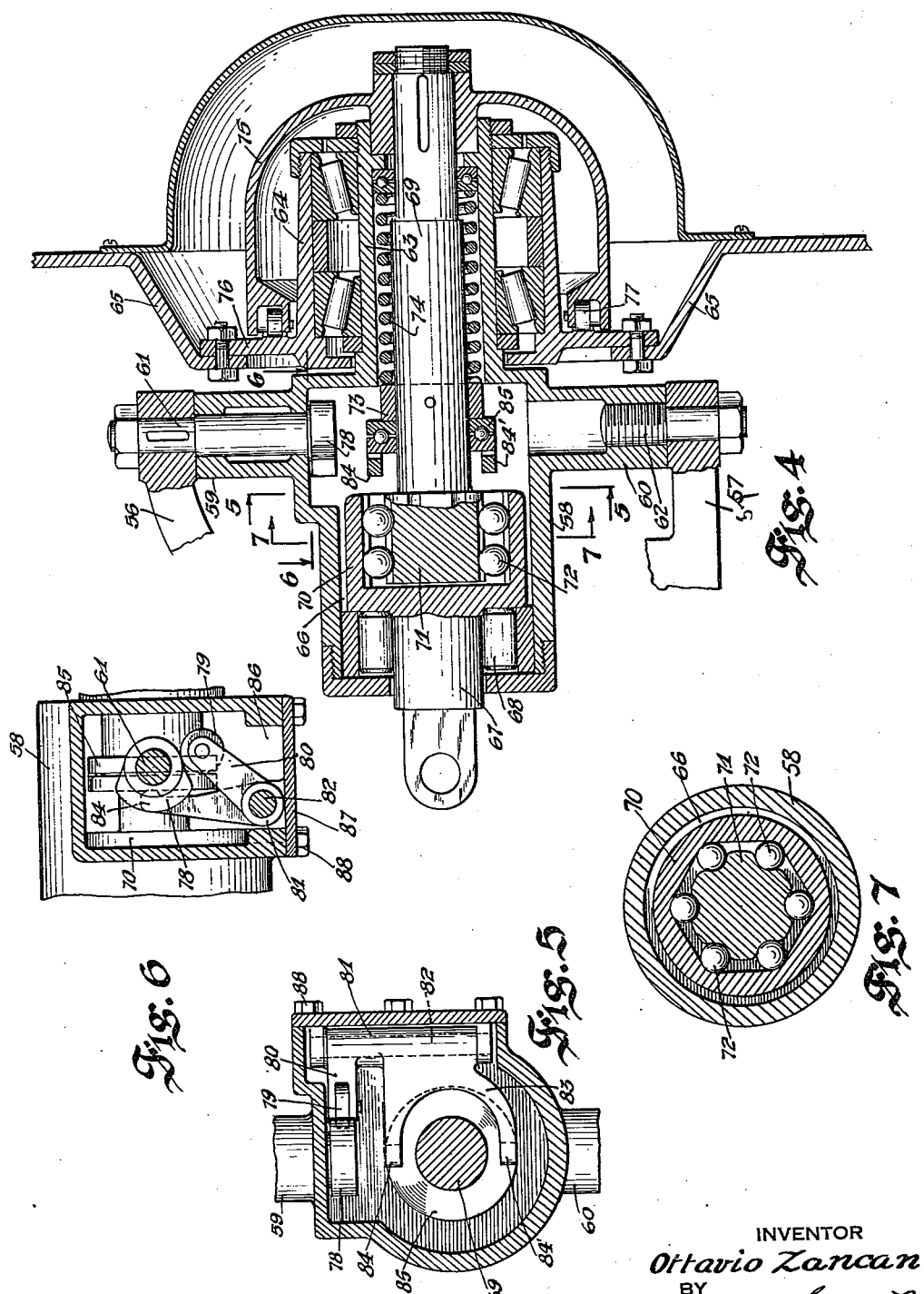

Patented Aug. 11, 1936

2,050,910

UNITED STATES PATENT OFFICE 2,050,910

CLUTCH

Ottavio Zancan, New York, N. Y.

Application December 11, 1934, Serial No. 756,909

4 Claims. (Cl. 192—67)

This invention relates to power transmitting devices and more particularly refers to improvements in clutches, and its primary object is to provide a clutch of a novel and improved construction, adapted to normally effect a positive connection between a driving and a driven member and to automatically become a slipping clutch when a disconnecting movement of one of said members with respect to the other has been started.

Another object is to provide a novel and improved type of clutch where the movement for engaging one of the members to the other, or disengaging it therefrom, can be effected virtually without friction and with an easy and smooth action.

A further object of the invention is to provide a clutch of a novel and improved character, particularly adapted for use in connection with front wheel drives for motor cars, the clutch being instantly responsive to changes between the normal driving speed and the speed of the driven wheel and being so constructed as to prevent jamming and undue wear.

Other objects and advantages of the present invention will more fully appear as the description proceeds and will be set forth and claimed in the appended claims.

My invention is illustrated by way of example in the accompanying drawings, in which:

Fig. 4 is a vertical longitudinal section of a front wheel drive for motor cars, embodying my invention;

Fig. 5 is a vertical cross section thereof through line 5—5 of Fig. 4;

Fig. 6 is a fragmentary plan section through line 6—6 of Fig. 4;

Fig. 7 is a fragmentary cross section through line 7—7 of Fig. 4; and

When its two members are fully engaged my improved clutch is a positive drive clutch, but as soon as an initial movement of disconnection has been started the clutch becomes a slipping clutch and the disconnection between the two members may progress automatically, due to the reaction of one of the members against the other, or else it may be controlled while at the same time being assisted by the said reaction.

In a slipping clutch of the ordinary type, considerable pressure must be exerted against the movable clutch member in order to hold it into engagement with the other member. In fact, the pressure must be such as to result in a virtually positive connection taking place between the two members until the resistance to the movement of the driven member exceeds a certain predetermined maximum. At such times, the reaction of the driven against the driving member will cause the one of the members which is movable with respect to the other to automatically slip out of engagement in order to prevent jamming or breakages or other damage taking place.

In view of the fact that in my improved clutch the positive connection between the two members of the clutch is not dependent upon the pressure exerted against the movable member, but is dependent upon the relative position of said two members, it is sufficient to exert a relatively small pressure against the movable member so that a more sensitive and easily operable structure results; furthermore, a positive connection is always assured so long as an initial movement of disconnection between the two members does not take place.

One of the features of my improved clutch resides in the use of rollers carried by one of the members of the clutch, said rollers engaging corresponding recesses in the other member. This feature, which could also be used in a slipping clutch of the ordinary type, causes the automatic disengagement of the two clutch members to take place in a smooth and easy manner, virtually without friction, so that, as a result, the life of the clutch will be immeasurably increased.

My improved clutch is particularly well adapted for use in front wheel drives for motor cars, and in this connection I have already shown and described it in an application for patent, entitled, "Front drives for motor cars", Serial No. 695,338, copending herewith, matured into Patent No. 2,003,166, of which the present application is a continuation in part.

Figure 1:
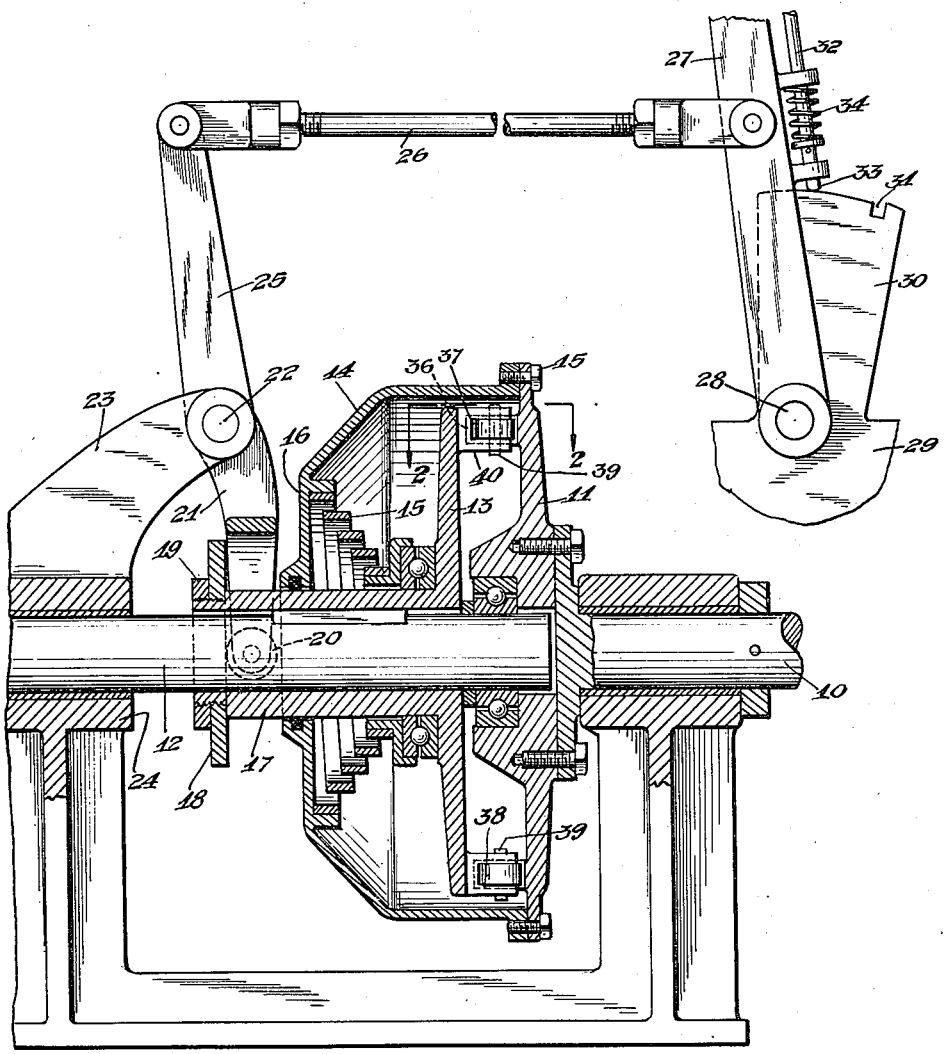
Fig. 1 is a vertical longitudinal section of a power transmission mechanism, including my improved clutch.
Figure 2:
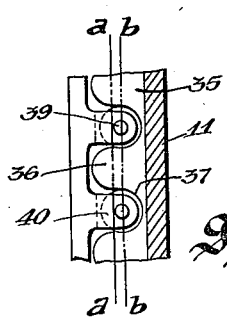
Fig. 2 is a vertical section thereof through line 2—2 of Fig. 1, showing a plane development of the interengaging portions of the clutch.

Referring to Figs. 1 and 2 of the drawings, 10 designates a driving shaft carrying a stationary clutch member 11 and 12 is a driven shaft, carrying a clutch member 13 slidable thereon, and adapted to become engaged with or disengaged from clutch member 11. Clutch member 11 carries a housing 14, fixed thereon by means of screws 15, enclosing clutch member 13, a spring 15 being interposed between the rear wall 16 of said housing and said clutch member 13, said spring urging said clutch member 13 into engagement with clutch member 11.

Clutch member 13 is formed integral with a sleeve 17, extending rearwardly therefrom, said sleeve being slidably keyed on shaft 12, and projecting through and beyond rear wall 16 of housing 14. At its rear end said sleeve carries a washer 18, held in place by a nut 19, said washer forming a bearing surface for rollers 20 carried by a forked clutch lever 21.

Said clutch lever is pivoted at 22 on a bracket 23, extending from support 24 of shaft 12 and is formed with an upwardly extending arm 25, articulatedly connected by means of a connecting rod 26 to a controlling lever 27.

Said controlling lever is pivotally mounted at 28 to a fixed support 29, said support being formed with a segmental extension 30 concentric to pivot 28. Said segmental extension has a notch 31, which is adapted to be engaged by a sliding bolt 32, carried by lever 27, when said lever is displaced to the right from the position shown until bolt 32 registers with notch 31 and its end 33 can extend into said notch under the action of a spring 34.

So far as described, the construction merely represents a conventional form of clutch structure, the operation of which is controlled by a lever 27; due to the action of spring 15, clutch member 13 normally engages clutch member 11 so that the rotation of shaft 10 is transmitted to shaft 12.

When controlling lever 27 is moved to the right its movement will be transmitted to clutch lever 21 by connecting rod 26, and said clutch lever will in turn withdraw clutch member 13 from its position of engagement, so that the shaft 12 will become disconnected from shaft 10.

The novel feature of my invention resides in the construction of the clutch members themselves and in the manner in which the clutch operates as a result of such construction. Referring more especially to Fig. 2, it is seen that clutch member 11 is formed with an inwardly extending circumferential flange 35 having an undulated outline, consisting of a circumferential series of rounded teeth 36, separated by recesses 37, the bottom of which has a semicircular profile.

The rounded tips of teeth 36 are connected to the semi-circular bottoms of recesses intervening therebetween by straight parallel sections; for instance, the tips of teeth 36 may also have a semi-circular profile, as shown, the centers of said profiles all lying in a plane a—a at right angles to the axis of shafts 10, 12, and the centers of semi-circular bottoms of recesses 37 may all lie on another plane b—b, parallel to and inwardly spaced from plane a—a, the semi-circular outlines of the tips of said teeth and the bottoms of said recesses being joined to one another by short sections at right angles to planes a—a, b—b.

Clutch member 13 carries a number of circumferentially spaced rollers 38, rotatably mounted on pins 39 carried by inwardly extending lugs 40, said rollers having a diameter corresponding to that of the width of recesses 37, and being spaced so as to make it possible for clutch member 13 to mesh with clutch member 11. It must be understood that while the number of rollers 38 may correspond to the number of recesses 37, a smaller number of rollers evenly spaced along the circumference of clutch member 13 will do.

By virtue of the construction described, it will be seen that when clutch member 13 is fully engaged with clutch member 11, a positive connection results since rollers 38 bear against surfaces which are directed at right angles to the line of travel. When clutch member 13 is moved away from clutch member 11 against the action of spring 15, the condition of positive engagement will persist until the plane passing through the centers of pins 39 has passed beyond plane a—a passing through the centers of the tips of teeth 36. As soon as this condition has been reached, the connection between the two clutch members is no longer a positive one and the clutch will thereafter function as a slipping clutch.

It will be observed that while in an ordinary slipping clutch an operative connection between the two clutch members is generally effected by providing a spring pressure against the movable member of the clutch sufficiently high to overcome the resistance normally opposing the movement of the driven member, in the present instance the spring need exert only a pressure sufficient to force to and retain the movable member of the clutch in its operative position, since there is no tendency, due to the driving action, to force the movable member of the clutch out of engagement.

As stated, as soon as the movable member of the clutch has been forced away from its position of engagement a sufficient distance that in practice needs be but very small, the clutch will function as a slipping clutch with a very easy movement, due to the presence of rollers 38, so that the reaction taking place between the two clutch members will continue to automatically force the movable member of the clutch outwardly to its fully disengaged position.

In the case illustrated, it is, therefore, sufficient to move lever 27 a small distance to the right and the clutch will then become automatically disengaged. By continuing the movement of lever 27 in the same direction, it may be brought to a position where tip 33 of bolt 32 engages notch 31, and locks the clutch in its inoperative position. In order to thereafter reestablish an operative clutch connection it will be sufficient to release bolt 32 and spring 15 will cause the clutch member 13 to snap into engagement with clutch member 11.

In this manner, a very smooth action virtually free from friction is obtained in the operation of the clutch together with a rapid disengagement and reengagement of the two clutch members. Furthermore, by proper proportioning of the various parts a very small movement of the movable member of the clutch in the disengaging direction will be sufficient to cause the clutch to become fully disengaged so that the possibility of jamming will be entirely avoided.

Figure 3:
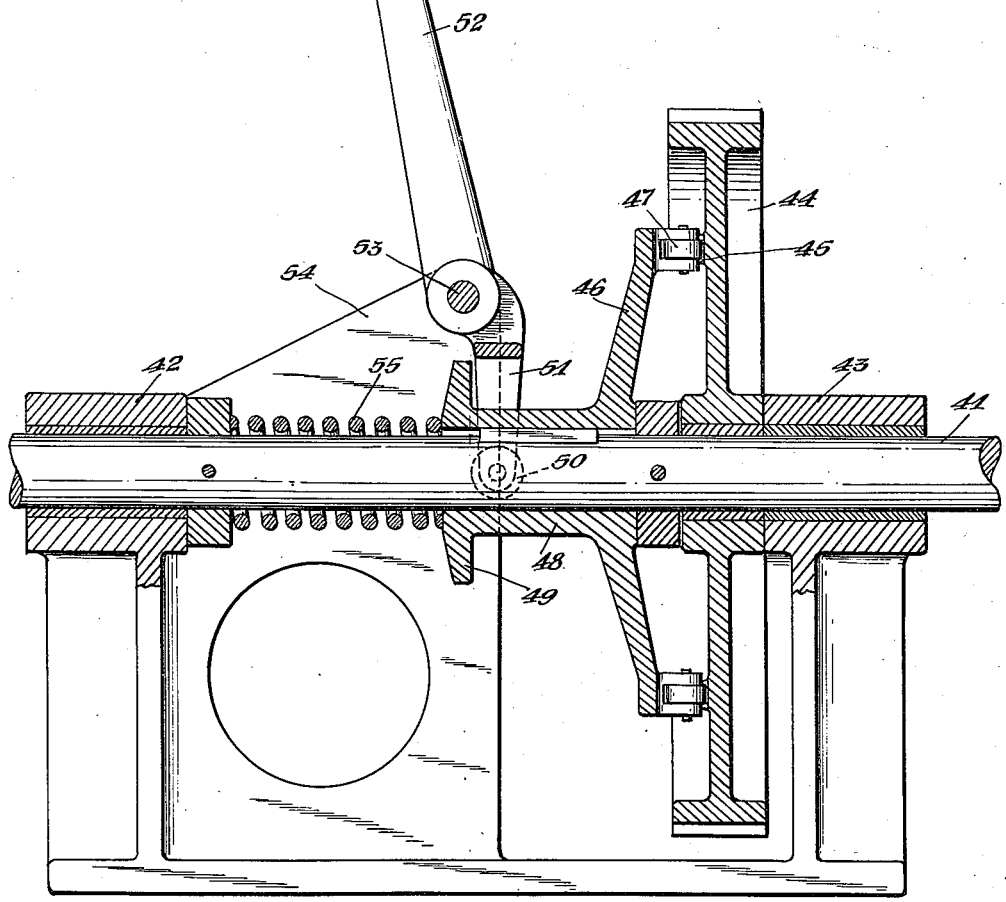
Fig. 3 is a vertical longitudinal section of another power transmission mechanism, including my clutch, illustrating a somewhat different construction of its various parts.

In the arrangement of Fig. 3, my clutch is shown applied in connection with an element, such as a gear or a pulley, loosely mounted on a continuously rotating shaft. In the same 41 designates a shaft rotatably mounted on supports 42, 43; 44 designates a gear loosely mounted on said shaft, said gear being formed with a flange 45 having recesses similar to those shown at 37 in Fig. 2, and 46 designates a clutch member slidably keyed on shaft 41, said clutch member carrying a plurality of circumferentially spaced rollers 47, adapted to engage the recesses of flange 45 in the manner previously explained.

Said shiftable clutch member has a hub 48 formed integral with a flange 49, providing a surface against which rollers 50 bear, said rollers being carried by the forked portion 51 of a clutch lever 52, pivotally mounted at 53 onto a bracket 54, integral with support 42. A spring 55 bearing against the rear surface of flange 49 constantly urges clutch member 46 into positive engagement with gear 44.

By virtue of this arrangement it will be seen that gear 44 normally rotates together with shaft 41. As soon as clutch lever 52 is angularly displaced towards the right enough to bring rollers 47 opposite the curved portion of the tips of the teeth of flange 45, the clutch connection will instantly become of the slipping type as explained, and clutch member 46 will be forced out of engagement with gear 44.

My improved clutch is especially useful when used in connection with a front wheel drive for motor cars where it is necessary to provide for easy steering action and instant response to the changes taking place in the relative speeds of the outer and inner wheels of a car when taking a turn. It is well known that when a car is made to turn a corner the outer wheel must rotate at a higher speed than the inner wheel, so that one of the wheels should be driving and the other should be made loose on its shaft. Due to the greater leverage, in practice, the driving wheel is always the outer wheel, and, therefore, in the front drive mechanism shown and described in my copending application above referred to, I have provided an arrangement whereby when the car is made to turn to the right or to the left, the inner wheel is automatically disconnected from the driving shaft; and in order to effect its disconnection in an easy and positive manner I make use of the clutch forming the subject of the present invention.

This practical application of my clutch is illustrated in Figs. 4 to 7, in which, 56, 57 are the upper and lower extensions respectively of one of the forked ends of a motor car front axle. The steering knuckle 58 is provided with an upper pivotal bushing 59 and a lower pivotal bushing 60, mounted on studs 61, 62, fixed on and inwardly extending from parts 56, 57, respectively, said studs being, of course, coaxial with each other.

The steering knuckle is formed integral with an outwardly extending hollow sleeve 63, on which is rotatably mounted the hub 64 of wheel 65, and the inner end of said steering knuckle forms a housing 66, within which is rotatably mounted a universal joint socket 67, supported by rollers 68.

Said socket is operatively connected to a spindle 69, coaxial with hollow sleeve 63, and extending therefrom in a manner causing said spindle to be positively driven by socket 67 while permitting axial displacement of said spindle with respect to said socket.

Such a connection is preferably effected in the manner shown in Figs. 4 and 7, in which it is seen that the universal joint socket is formed with a housing 70, having a hexagonal inner outline, and the inner end 71 of spindle 69 is formed with six evenly spaced longitudinal grooves forming together with the angular portions of the hexagonal outline of housing 70, longitudinal guideways for balls 72 interposed between parts 70 and 71.

By virtue of this arrangement, balls 72 will positively transmit to spindle 69 the rotation of socket 67 while at the same time permitting axial displacement of the spindle with respect to the socket without any appreciable amount of friction.

Spindle 69 carries a collar 73, against which bears a spring 74 normally retaining the spindle in the position shown where it is fully retracted with respect to housing 70 of socket 67. In this position, a clutch member 75 carried by the outer end of spindle 69 is in positive engagement with clutch member 76 formed integral with hub 64, said clutch member 76 being provided with a toothed flange having recesses engaged by rollers 77, carried by clutch member 75 in the manner explained in connection with the mechanism shown in Figs. 1, 2.

When spindle 69 is slightly displaced in an outward direction, the positive connection between the two clutch members becomes a slipping connection, as previously explained, so that the wheel will become instantly disconnected from the driving spindle.

At its inner end stud 61 carries a cam 78, against which bears a roller 79 carried by an arm 80 of a clutch actuating lever 81, pivotally mounted at 82 within the hollow steering knuckle. Said clutch lever 81 is formed integral with a forked extension 83, the tips of which 84, 84', bear against the rear surface of a thrust bearing 85, mounted on spindle 69 behind collar 73.

The drawings illustrate the right hand wheel so that, referring to Fig. 6, it is seen that if the steering knuckle is inwardly displaced in a clockwise direction with respect to its pivot 61, pivot 82 of clutch lever 81 will follow the angular displacement of the steering knuckle, and roller 79 rotating over cam 78 will cause a gradual angular displacement of the clutch lever in a clockwise direction with respect to its pivot 82. The tips 84, 84' of forked extension 83 will therefore force spindle 69 outwardly against the action of spring 74 so that eventually rollers 77 will reach the position where the clutch connection becomes of the slipping type and the wheel will automatically become disconnected from the driving spindle. The chamber formed by the hollow steering knuckle within which clutch lever 81 is housed preferably has an opening at the rear, as shown at 86, said opening being closed by a plate 87, carrying pivot 82, said plate being held in position by screws 88. This arrangement, therefore, makes it possible to easily reach the working parts of the mechanism and to easily assemble the same.

The steering of a car is, of course, generally effected while the car is in motion, so that when the car is made to take a turn the inner wheel continues to rotate, but at a speed which is lower than that of its driving spindle, the speed of the driving spindle being the same as that of the outer wheel. This means that the clutch member 75 carried by the spindle will become disconnected from the wheel which is also rotating in a gradual and very easy manner, free from shocks, so that no material resistance will be offered by the disconnecting of the clutch to the steering action.

It is obvious that such would not be the case if the clutch were of the type where the clutch connection is effected by means of intermeshing sliding toothed members, where the pressure exerted by one member against the other would take place as long as the two members are interlocking and where the friction would be of a sliding, not of a rolling character.

It is, therefore, obvious that my improved type of clutch is particularly advantageous in connection with front wheel drives for motor cars both in providing as it does an easy action and in positively preventing the possibility of jamming.

In all the arrangements described the clutch is shown composed of an axially stationary member and a roller-carrying member shiftable along the driving shaft. It is within the scope of my invention to provide a clutch where both members are restrained against axial displacement, the rollers only being movable away from the recesses engaged thereby, or vice versa.

Figure 8:
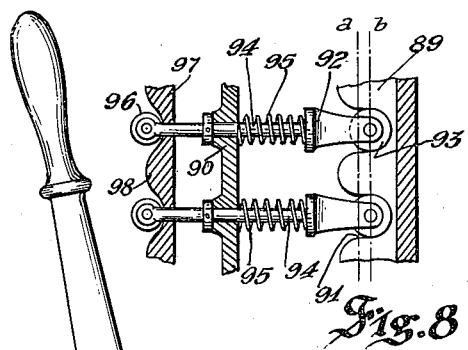
Fig. 8 is a fragmentary cross section illustrating a possible alternative form of my invention.

As an illustration, in Fig. 8, 89 designates one of the clutch members that for the sake of example is assumed to be the driven member, 90 designates the driving member, which is fixed on its shaft and restrained against axial displacement with respect thereto, 91 designates the recesses, and 92 carriers for the rollers 93 engaging said recesses.

Said carriers are provided with stems 94, inserted through clutch member 90 and are movable towards and away from clutch member 89, springs 95 urging them in their position of engagement shown in the drawings. At the rear each stem 94 carries a roller 96 which bears against a cam member 97, which may be angularly displaced about the shaft (not shown) carrying clutch member 90. Said cam member is provided with outwardly bulging portions 98, which will cause a slight outward displacement of rollers 96 and, therefore, of carriers 92 and rollers 93 when said cam member is angularly displaced in either direction. It is thus seen that by turning cam member 97 in one or the other direction, rollers 93 can be outwardly displaced from the recesses 91 to a point where the reaction between rollers 93 and the slanted or rounded sides of the recesses will cause said rollers 93 to leave the recesses altogether so that the positive clutch connection taking place when the rollers are fully inserted within the recesses will thus become a slipping connection.

The drawings are intended for illustrative purposes only and not in a limiting sense. I accordingly reserve the right to carry my invention into practice in all those ways and manners which may enter, fairly, into the scope of the appended claims.

I claim:

1. A clutch of the character described comprising a driving member and a driven member, one of said members being movable to and from the other, one of said members having recesses and the other having rollers adapted to register and interlock therewith, the depth of said recesses being at least equivalent to the radius of said rollers, and their sides having their inner portion directed substantially at right angles to the plane of rotation of said members, and their outer portion directed at a slant thereto, thereby causing said rollers to establish a positive driving connection between said two members, when fully inserted within said recesses and to establish a slipping connection therebetween, when the movable clutch member is moved away from its position of full engagement with the other.

2. A clutch of the character described comprising a driving member and a driven member, one of said members being movable to and from the other, one of said members having recesses and the other having rollers adapted to register and interlock therewith, the depth of said recesses being at least equivalent to the radius of said rollers, and their sides having their inner portion directed substantially at right angles to the plane of rotation of said members, and their outer portion directed at a slant thereto, thereby causing said rollers to establish a positive driving connection between said two members, when fully inserted within said recesses, and to establish a slipping connection therebetween, when the movable clutch member is moved away from its position of full engagement with the other, and means for moving said movable clutch member away from said position, so as to initiate the disconnection of one clutch member from the other.

3. A clutch of the character described comprising a driving member and a driven member, one of said members being movable to and from the other, one of said members having recesses and the other having rollers adapted to register and interlock therewith, the depth of said recesses being at least equivalent to the radius of said rollers, and their sides having their inner portion directed substantially at right angles to the plane of rotation of said members, and their outer portion directed at a slant thereto, thereby causing said rollers to establish a positive driving connection between said two members, when fully inserted within said recesses, and to establish a slipping connection therebetween, when the movable clutch member is moved away from its position of full engagement with the other, means urging said movable member to said position of full engagement, and means for forcing said movable member away from said position, so as to initiate the disconnection of one clutch member from the other.

4. A clutch of the character described comprising a driving member and a driven member, one of said members being movable to and from the other, one of said members having recesses and the other having rollers adapted to register and interlock therewith, the depth of said recesses being at least equivalent to the radius of said rollers, and their sides having their inner portion adapted to establish a positive non-slipping connection wth said rollers, and their outer portion directed at a slant to the plane of rotation of said members, thereby causing said rollers to establish a positive driving connection between said two members, when fully inserted within said recesses, and to establish a slipping connection therebetween, when the movable clutch member is moved away from its position of full engagement with the other.

OTTAVIO ZANCAN.